(12) United States Patent
Wilson, Jr. et al.

(10) Patent No.: US 12,393,982 B2
(45) Date of Patent: *Aug. 19, 2025

(54) NON-BIASED, CENTRALLY-CLEARED FINANCIAL INSTRUMENT AND METHOD OF CLEARING AND SETTLING

(71) Applicant: ERIS INNOVATIONS, LLC, Chicago, IL (US)

(72) Inventors: Donald R. Wilson, Jr., Chicago, IL (US); Yuhua Yu, Chicago, IL (US)

(73) Assignee: Eris Innovations, LLC, Chicago, IL (US)

( * ) Notice: Subject to any disclaimer, the term of this patent is extended or adjusted under 35 U.S.C. 154(b) by 139 days.

This patent is subject to a terminal disclaimer.

(21) Appl. No.: 17/988,279

(22) Filed: Nov. 16, 2022

(65) Prior Publication Data

US 2023/0078083 A1    Mar. 16, 2023

Related U.S. Application Data

(60) Continuation of application No. 17/569,960, filed on Jan. 6, 2022, now Pat. No. 11,556,990, which is a
(Continued)

(51) Int. Cl.
*G06Q 40/04* (2012.01)
*G06Q 40/06* (2012.01)
*G06Q 99/00* (2006.01)

(52) U.S. Cl.
CPC ............ *G06Q 40/04* (2013.01); *G06Q 40/06* (2013.01); *G06Q 99/00* (2013.01)

(58) Field of Classification Search
CPC .................................................... G06Q 40/06
See application file for complete search history.

(56) References Cited

U.S. PATENT DOCUMENTS

| 6,304,858 | B1 | 10/2001 | Mosler |
| 7,236,952 | B1 | 6/2007 | D'Zmura |

(Continued)

FOREIGN PATENT DOCUMENTS

| JP | 2003-006432 | 1/2003 |
| JP | 2003-242344 | 8/2003 |

(Continued)

OTHER PUBLICATIONS

International Preliminary Report on Patentability, in International Application No. PCT/US2011/001442 dated Mar. 29, 2012.
(Continued)

*Primary Examiner* — Asha Puttaiah
(74) *Attorney, Agent, or Firm* — Barich IP Law Group

(57) ABSTRACT

In accordance with the principles of the present invention a non-biased, computer-implemented financial instrument electronic trading system and electronic central clearinghouse are provided. The electronic trading system and electronic central clearinghouse operate to provide electronic trading of financial instruments that are non-biased in that the electronic trading system and electronic clearing house address at least one of two effects that result from the difference between variation margin on a cleared financial instrument and collateral posted on an uncleared financial instrument, the first effect being a systematic advantage of being short the financial instrument when there is a correlation between the value of the financial instrument and interest rates, referred to as a convexity bias, and the second effect being a distortion in the financial instrument when an underlying asset value of the financial instrument changes, referred to as a net present value (NPV) effect.

9 Claims, 3 Drawing Sheets

Related U.S. Application Data continuation of application No. 16/713,140, filed on Dec. 13, 2019, now Pat. No. 11,250,509, which is a continuation of application No. 15/731,589, filed on Jul. 5, 2017, now Pat. No. 10,586,284, which is a division of application No. 12/806,860, filed on Aug. 23, 2010, now Pat. No. 9,747,641.

(56) References Cited

U.S. PATENT DOCUMENTS

| | | | |
|---|---|---|---|
| 8,438,099 | B2 | 5/2013 | Co et al. |
| 10,387,957 | B2 | 8/2019 | Haines et al. |
| 2001/0044771 | A1 | 11/2001 | Usher et al. |
| 2003/0033212 | A1 | 2/2003 | Sandhu et al. |
| 2004/0024692 | A1 | 2/2004 | Turbeville et al. |
| 2004/0215539 | A1 | 10/2004 | Doi et al. |
| 2005/0080734 | A1 | 4/2005 | Lynch et al. |
| 2005/0171884 | A1 | 8/2005 | Arnott |
| 2006/0080208 | A1 | 4/2006 | Harrison |
| 2006/0224494 | A1* | 10/2006 | Pinkava ............. G06Q 40/04 705/37 |
| 2006/0253383 | A1 | 11/2006 | Cummings et al. |
| 2006/0259381 | A1 | 11/2006 | Gershon |
| 2007/0055609 | A1 | 3/2007 | Whitehurst et al. |
| 2007/0100727 | A1 | 5/2007 | Multer et al. |
| 2007/0156573 | A1 | 7/2007 | Whitehurst et al. |
| 2007/0239589 | A1 | 10/2007 | Wilson et al. |
| 2007/0288351 | A1 | 12/2007 | Huntley |
| 2008/0005016 | A1 | 1/2008 | Uhlmann et al. |
| 2008/0059382 | A1* | 3/2008 | Burczyk ............. G06Q 40/00 705/37 |
| 2008/0249956 | A1 | 10/2008 | Connors |
| 2009/0171826 | A1 | 7/2009 | Hadi et al. |
| 2010/0106633 | A1 | 4/2010 | Iyer et al. |
| 2011/0153521 | A1* | 6/2011 | Green ............. G06Q 40/06 705/36 R |
| 2013/0179319 | A1 | 7/2013 | Barker et al. |

FOREIGN PATENT DOCUMENTS

| | | |
|---|---|---|
| JP | 2004-521400 | 7/2004 |
| JP | 2005-503608 | 2/2005 |
| WO | 2011/075411 | 6/2011 |

OTHER PUBLICATIONS

International Search Report, in International Application No. PCT/US2011/001442 dated Mar. 29, 2012.
International Search Report, in International Application No. PCT/US2012/038679 dated Jan. 29, 2013.
International Preliminary Report on Patentability, in International Application No. PCT/US2012/038687 dated Nov. 19, 2013.
International Search Report, in International Application No. PCT/US2012/038687 dated Jan. 28, 2013.
Extended European Search Report, in European Patent Application No. 11820273.8 dated Mar. 23, 2014.
Extended European Search Report, in European Patent Application No. 12724493.7 dated Oct. 9, 2014.
Extended European Search Report, in European Patent Application 12729762.0 dated Sep. 10, 2014.
Burghardt and Hoskins, "The Convexity Bias in Eurodollar Futures", Derivatives Quarterly (1995).
Chen, Cheng, Fabozzi, and Liu, "An Explicit, Multi-Factor Credit Default Swap Pricing Model with Correlated Factors", 43 J.F. & Q.A. 123 (Mar. 2008).
Grant, Weitzman, and Mackenzie, "Chicago Traders Launch New Derivatives Exchange", Financial Times (Jul. 13, 2010).
Kaplin, Qu, Wang, Wang, and Zhang, "The Relationship Between Default Risk and Interest Rates: An Empirical Study", Moody's Analytics (Oct. 2, 2009).
Website Information: https://papers.ssrn.com/sol3/papers.cfm?abstract_id=1783798; "Central Clearing of Interest Rate Swaps: A Comparison of Offerings", Mar. 11, 2011.
Machine Translation JP 2003-242344.
Machine Translation JP 2003-006432.

* cited by examiner

NON-BIASED, CENTRALLY-CLEARED FINANCIAL INSTRUMENT AND METHOD OF CLEARING AND SETTLING

CROSS REFERENCE TO RELATED APPLICATIONS

This application is a continuation of U.S. patent application Ser. No. 17/569,960, filed Jan. 6, 2022, entitled "Non-Biased, Centrally-Cleared Financial Instrument and Method of Clearing and Settling," which is a continuation of U.S. patent application Ser. No. 16/713,140, filed Dec. 13, 2019, entitled "Non-Biased, Centrally-Cleared Financial Instrument and Method of Clearing and Settling," now U.S. Pat. No. 11,250,509, which is a continuation of U.S. patent application Ser. No. 15/731,589, filed Jul. 5, 2017, entitled "Non-Biased, Centrally-Cleared Financial Instrument and Method of Clearing and Settling," now U.S. Pat. No. 10,586,284, which is a divisional of U.S. patent application Ser. No. 12/806,860, filed Aug. 23, 2010, now U.S. Pat. No. 9,747,641, entitled "Non-Biased, Centrally-Cleared Financial Instrument and Method of Clearing and Settling", all of which are hereby incorporated by reference in their entirety.

FIELD OF THE INVENTION

The present invention relates to financial instruments, and to the electronic clearing and settling of such financial instruments.

BACKGROUND OF THE INVENTION

A variety of different types of financial instruments are traded throughout the world. Examples include cash contracts and derivatives. A cash contract is an agreement for either immediate or deferred delivery of the specified asset. A derivative is a financial instrument whose value is linked to the price of an underlying commodity, asset, rate, index, currency or the occurrence or magnitude of an event. Typical examples of derivatives include futures, forwards, options, and swaps.

Most commonly, a swap is an agreement between two parties to exchange sequences of cash flows for a set period of time. Usually, at the time the swap is initiated, at least one of these series of cash flows is benchmarked to an asset or an index that is variable, such as an interest rate, foreign exchange rate, equity price or commodity price. A swap may also be used to exchange one security for another to change the maturity (bonds), quality of issues (stocks or bonds) or to facilitate a change in investment objectives.

A nomenclature has developed to describe the characteristics of certain swaps. A "plain-vanilla" swap is one that only has the simplest and most common terms. A "spot" starting swap is one where the economics of the swap start almost immediately upon two parties entering into the swap. A "seasoned" swap is one that has been in existence for some time. A "forward-starting" swap is one where the first calculation date of the swap does not commence until a designated point in the future. The parties to a forward-starting swap are still responsible for performing their obligations, but these obligations do not start for a period of time after the parties have agreed to enter into the swap. An "off-market" swap is one that has a value other than zero at initiation.

The first swap occurred between IBM and the World Bank in 1981. Although swaps have only been trading since the early 1980's, they have exploded in popularity. In 1987, the swaps market had a total notional value of $865.6 billion; by mid-2006, this figure exceeded $250 trillion. That is more than 15 times the size of the U.S. public equities market.

The most common type of swap is an interest-rate swap. In a plain-vanilla, interest-rate swap, two parties agree to exchange periodic interest payments, typically when one payment is at a fixed rate and the other varies according to the performance of an underlying reference rate. Interest-rate swaps are generally quoted in yield terms. Conceptually, an interest-rate swap can be viewed as either a portfolio of forwards, or as a long (short) position in a fixed-rate bond coupled with a short (long) position in a floating-rate bond. Commonly, for U.S. dollar denominated interest-rate swaps, the rate quoted is the fixed rate that the market expects will offset future 3-month London InterBank Offered Rate (LIBOR) (or whatever underlying reference rate is specified in the swap). (LIBOR refers to a daily reference rate based on the interest rates at which banks borrow unsecured funds from other banks in the London wholesale interbank market.) Cash then flows on a periodic basis between the buyer and the seller depending on the difference between the fixed rate and the floating rate. For example, one party (Party A) agrees to pay another party (Party B) a predetermined, fixed rate of interest on a notional amount on specific dates for a specified period of time; concurrently, Party B agrees to pay Party A a floating interest rate on that same notional amount on the same specified dates for the same specified time period. Interest payments may be made annually, quarterly, monthly or at any other interval determined by the parties.

Standardized derivatives have traditionally been exchange-traded and centrally-cleared financial instruments; swaps, on the other hand, have traditionally been customized financial instruments that are traded in the over-the-counter (OTC) market. (The OTC market most commonly refers to privately negotiated trades between two parties that are not centrally cleared (i.e. uncleared).) Each party looks solely to the other party for performance and is thus exposed to the credit risk of the other party (often referred to as counterparty risk). Unlike financial instruments that are centrally cleared, there is no independent guarantor of performance. Uncleared swaps are often transacted pursuant to International Swaps and Derivatives Association (ISDA) master documentation. The ISDA, 360 Madison Avenue, 16th Floor, New York, New York 10017 is an association formed by the privately negotiated derivatives market that represents participating parties.

It is common for collateral to change hands as the value of an uncleared position changes. The party that has an unrealized loss on an open, uncleared position will post collateral with the party that has the unrealized gain in order to secure its liability. A common form of collateral is obligations of the United States Treasury (i.e. Treasury Bonds, Notes, and Bills). When a Treasury obligation is posted as collateral, price changes in that financial instrument and coupon payments accrue to the owner of the collateral, that being the party posting the financial instrument. Cash may also be posted as collateral, in which case the party receiving the cash as collateral is obligated to pay interest to the party posting the cash collateral at a rate set by agreement between the parties. When the trade is unwound or expires, the party holding the collateral returns it to the other party, and the trade is ultimately settled.

Financial instruments traded on exchanges are distinctly different from uncleared financial instruments. While the economics of the two may be similar, futures and options on futures (futures options) are traded on and pursuant to the rules of an exchange. Unlike uncleared financial instruments where the parties set the terms of the trade, exchange-listed futures and futures options are standardized. Such terms include notional amount, price change per increment, expiration date, and how the financial instrument is settled (either cash settlement or physical delivery) at expiration. The only matters for parties to negotiate in futures, other than which party is the buyer and which party is the seller, is the number of financial instruments to be traded and the price.

All futures and futures options are centrally cleared. This is quite different from uncleared financial instruments discussed above. Central clearing means that the counterparty risk is removed. The parties to a trade cease to be counterparties to each other; rather, each party faces a clearinghouse and looks solely to the clearinghouse for performance. (A clearinghouse is an agency of an exchange or separate entity responsible for settling trading accounts, clearing trades, collecting and maintaining margin, regulating delivery and reporting trading data.)

Recently, there has been a trend for OTC financial instruments to be centrally cleared. In certain circumstances, parties to an OTC financial instrument can submit the financial instruments to a clearinghouse for central clearing. Once the trade is accepted by a clearinghouse, the counterparty risk is eliminated, and each party then faces the clearinghouse. For example, on the Chicago Mercantile Exchange Group's (CME), ClearPort facility, 20 South Wacker Drive, Chicago, Illinois 60606, OTC trades in certain financial instruments may be converted into futures or futures options, as the case may be, upon acceptance by CME's clearinghouse. In effect, these "OTC" financial instruments go through a transformation into futures or futures options. Other financial instruments may be accepted by a clearinghouse for central clearing, but do not convert into futures and remain customized. In these cases, like all centrally-cleared financial instruments, the counterparty risk is still eliminated.

The method by which clearinghouses treat margin on cleared financial instruments (including futures and non-standardized financial instruments accepted for central clearing) is considerably different from the uncleared norm. For both cleared and uncleared financial instruments there are two forms of margin: initial margin and variation margin. For a cleared financial instrument, both parties must post initial margin in an amount set by the clearinghouse upon initiation of a position and maintain that initial margin as long as the position is held. For an uncleared financial instrument, only one party (but not both as in cleared financial instruments) may be required to post initial margin (known as collateral for uncleared financial instruments). In the case of cleared and uncleared financial instruments, a party posting this collateral generally continues to earn interest on cash posted or, if a Treasury instrument is posted, continues to have the right to the coupons generated by the Treasury instrument and accrues the gains or losses from any change in the value of the Treasury instrument.

For variation margin, there is a dramatic difference between the treatment depending on whether the trade is cleared and uncleared. In both cases, margin moves as the marked-to-market value of the position changes. (Marked-to-market value reflects the current value of a financial instrument rather than its book value.) This movement of margin generally occurs on a daily basis. If a party receives variation margin by virtue of a profitable position in a cleared financial instrument, that party is the owner of the margin and may do whatever it chooses with such margin. On the other hand, in uncleared financial instruments, the party posting cash or Treasury instruments as collateral receives the interest on the cash posted or the coupon from the Treasury instrument and accrues the gains or losses from any change in the value of the Treasury instrument (if such a Treasury instrument is posted in lieu of cash).

There are two important effects that result from the difference in the treatment of variation margin between cleared and uncleared positions: the first effect is commonly known as the "convexity bias", and the second effect will be referred to herein as the "NPV effect". With respect to the convexity bias, assume a party establishes a short position in a Eurodollar future listed on the CME. Eurodollar futures are based on the 3-month LIBOR interest rate. The final settlement value for Eurodollar futures is equal to 100 minus the 3-month LIBOR rate. As interest rates rise, the price of Eurodollar futures decline. Further assume that shortly after establishing the position, the trade becomes profitable on a marked-to-market basis due to an increase in interest rates. As a result, the party receives variation margin in the form of cash equal to the profit. The party could now use the variation margin to purchase a zero-coupon Treasury bond.

Now assume that interest rates subsequently decline to where they were initially. This results in a payment of variation margin being due—equal to the initial amount received. The party is now in the same position as before the change in interest rates with respect to the futures profit and loss; however, because interest rates are now lower than they were when the zero-coupon bond was purchased, the party will realize a profit on the bond when liquidating it. Hence, there is a clear benefit to being short Eurodollar futures because of the positive correlation between the underlying futures and fixed-income instruments in general. As a result, Eurodollar futures trade at higher yields (lower prices) than related uncleared financial instruments, including interest-rate swaps.

If the underlying asset for the future was natural gas (rather than 3-month LIBOR), then the different treatment of cleared as compared to uncleared collateral schemes would not result in any significant benefit to being short (or long) futures as a result of the convexity bias. This is because there is generally little correlation between the price of a zero coupon bond and the price of natural gas, and the convexity bias only takes effect when such correlation is high.

In the example of Eurodollar futures, the benchmark underlying the future is 3-month LIBOR. There is a very high positive correlation between a zero coupon bond and a Eurodollar future. As first recognized in the early 1990's, this results in a fundamental benefit from being short exchange-traded, interest-rate futures relative to uncleared OTC interest-rate swaps, introducing what is known as a convexity bias in the pricing of interest-rate futures. See Burghardt and Hoskins, "The Convexity Bias in Eurodollar Futures: Part 1", 1 Derivatives Quarterly 47 (Spring 1995); Burghardt and Hoskins, "The Convexity Bias in Eurodollar Futures: Part 2", 59 Derivatives Quarterly 72 (Summer 1995). Unless addressed, the convexity bias exists for any financial instrument that is cleared where there is a correlation between the value of the financial instrument and interest rates.

In more detail, as noted by Burghardt and Hoskins: "There is a systematic advantage to being short Eurodollar futures relative to deposits, swaps, or FRAs [Forward Rate Agreements]. Because of this advantage, which we characterize as a convexity bias, Eurodollar futures prices should be lower than their so-called fair or proper values. Put differently, the 3-month interest rates implied by Eurodollar futures prices should be higher than the 3-month forward rates to which they are tied."

Because there is a high correlation between the yield of an interest-rate swap and interest rates, the convexity bias is highly relevant in determining the value of cleared interest-rate swaps and interest-rate swap futures. The value of the convexity bias is dependent on a number of factors, including the correlation and the volatility of the relevant asset. Under current market conditions, for a convexity biased cleared 10 year dollar denominated vanilla interest-rate swap, the bias is worth approximately 25 basis points (0.25%). It is important to note that when Burghardt and Hoskins first wrote about the convexity bias, interest-rate swaps were not cleared financial instruments.

The second effect that results from the difference between variation margin on a cleared financial instrument and collateral posted in an uncleared financial instrument will be referred to herein as the "NPV effect". While the NPV effect and the convexity bias are intertwined, cleared financial instruments that have no correlation to interest rates still will be subject to the NPV effect, though not subject to a convexity bias.

The following example illustrates the NPV effect. Assume that a party to a 10-year, natural-gas swap makes fixed monthly payments of $4 (the buyer of the swap), and receives floating payments equal to the spot price of natural gas from a counter party (the seller). Because this is a 10-year swap, these payments continue for 120 consecutive months. Assume further that on the date the swap was created, the 10-year, natural-gas forward curve is flat at $4. Therefore, the swap requires no upfront payments. On the day after the parties enter into the swap, the 10-year, natural-gas forward curve moves to a flat $5. At that point, the buyer expects to receive $1 every month for the next 10 years, or $120 over the next 10 years. The net present value of these cash flows, assuming a 6.0% annual interest rate, is approximately $90. Because of the assumed lack of correlation between the price of natural gas and interest rates in general, the convexity bias does not exist.

In the case of an uncleared natural-gas swap, the buyer receives $90, the net present value of the future cash flows, as collateral from the seller. If the buyer unwinds the trade by selling the swap to a third party for fair value, an upfront payment of $90 will be made to the original buyer, and the $90 collateral will be transferred to the third party. The original buyer has thus realized a profit of $90 and has liquidated its position.

Now consider a cleared natural-gas swap without any adjustments for the NPV effect. When the natural-gas forward curve moves to $5, the fair value settlement price of the cleared swap is $120, the sum of future cash flows. This is because futures by arbitrage-fee principle trade at their future value. Therefore the buyer receives $120 of variation margin today, as opposed to $90 in the uncleared case. The buyer could now exit or hedge off the position, and would be materially better off than had an uncleared swap been traded. This difference is caused by what is referred to herein as the NPV effect. Note that as interest rates approach zero, the NPV effect is eliminated.

Some exchanges and clearinghouses attempt to address this issue by requiring the swap to settle as if it were economically equivalent to an uncleared swap. In this case, the daily settlement price is defined as the net present value of the future cash flows. While this gives the impression that it solves the NPV effect, it does not: this creates a swap that is neither equivalent to a cleared nor an uncleared swap.

Continuing with the example, if the swap is required to settle at $90 after the move of the natural-gas forward curve to $5, the buyer receives $90 of variation margin. Now assume that the buyer sells the position to a third party. If the buyer sells the position for the new settlement price, and keeps the $90 of variation margin, then it would be in the same place as if it had traded an uncleared swap. But the new buyer will receive a windfall profit. The new buyer could hedge off the natural-gas price risk by entering into an offsetting, 10-year, $5 natural-gas swap, and receive $30 over the next 10 years. Clearly the existence of this risk-free profit demonstrates that the cleared swap traded at the settlement price of $90 was transacted at something other than fair value. In fact, to consummate the trade at fair value the third party must pay the original buyer the present value of this $30, or approximately $22 under our 6.0% assumed interest rate.

The above example demonstrates that the cleared swap, without an appropriate adjustment, generates a different profit and loss from the uncleared swap when the underlying asset value, the price of natural gas in the example, changes. Furthermore, the example uncovers a potential risk to the clearinghouse that, when the settlement methodologies are not properly delineated, the marked-to-market price may not reflect the actual fair value of the financial instrument. Because central clearing of swaps is relatively new, this effect is not widely known or understood.

The NPV effect also exists with respect to cleared credit default swaps (CDS). In a CDS, the protection buyer makes a series of payments to the protection seller, and in exchange the protection buyer receives a payment if the "reference entity", usually a corporation or government, defaults. A default includes such events as failure to pay, restructuring, and bankruptcy. In addition to the NPV effect, because of a correlation between the interest rate in general and the default rate a centrally-cleared CDS may have a convexity bias relative to an uncleared CDS. This convexity bias tends to be much smaller than in the case of interest-rate swaps. See, for example, Kaplin, Qu, Wang, Wang, and Zhang, "The Relationship Between Default Risk and Interest Rates: An Empirical Study", Moody's Analytics (2 Oct. 2009) (available at http://www.moodyskmv.com/research/files/Default_and_Interest_Rates.pdf (accessed 18 Aug. 2010); Chen, Cheng, Fabozzi, and Liu, "An Explicit, Multi-Factor Credit Default Swap Pricing Model with Correlated Factors", 43 Journal of Financial & Quantitative Analysis 123 (March 2008) (available at http://www.bnet.fordham.edu/rchen/jfqa-final.pdf) (accessed 18 Aug. 2010).

One attempt to simultaneously address the convexity bias and the NPV effect was the introduction of the "Price Alignment Interest" (PAI) in 2008 on the SwapClear Facility of LCH.Clearnet, Aldgate House, 33 Aldgate High Street, London EC3N 1EA U.K. (LCH.Clearnet is an independent clearinghouse serving exchanges and trading platforms, as well as a range of OTC markets. SwapClear is a service for the central clearing of OTC interest-rate swaps.) Counterparties initially enter into a bilateral interest-rate swap and subsequently submit the swap for clearing through LCH.Clearnet. Upon acceptance of the swap by LCH.Clearnet, the parties to the trade cease to be counterparties to each other and each faces LCH.Clearnet and looks solely to LCH.Clearnet for performance.

LCH.Clearnet introduced PAI to eliminate the convexity bias and the NPV effect. As noted in the LCH.Clearnet rules, "The payment of variation margin, or change in NPV [net present value], on a daily basis without adjustment would distort the pricing for swaps cleared through the Clearing House." LCH.Clearnet Rule 2C.6.4. To attempt to address this distortion, LCH.Clearnet charges interest on cumulative variation margin received and pays interest on cumulative variation margin paid.

However, PAI is not a viable solution for systems that process cleared financial instruments, including futures. As noted above, variation margin on a cleared position is currently calculated by marking a position to market. This calculation is undertaken on the basis of then-existing market prices, without regard to any convexity bias or NPV effect. The addition of PAI would require the calculation and processing of a separate and distinct form of variation margin. Unfortunately, the systems currently used by traditional futures clearinghouses, exchanges, brokers, and other market participants for calculating variation margin are not equipped to incorporate this additional calculation. Significant changes would be required across the industry to include PAI in the calculation of variation margin for cleared swaps, and it would be very difficult for the industry to adapt to such a methodology in a reasonable time frame.

While swaps have traditionally been uncleared, recently there has been pressure to migrate swaps to central clearing, including mandates set forth in the Dodd-Frank Wall Street Reform and Consumer Protection Act (the "Dodd-Frank Act") (Pub.L. 111-203, H.R. 4173) signed into law by President Obama on 21 Jul. 2010. As a result of political pressure for greater transparency of uncleared financial instruments, the Dodd-Frank Act was passed into law in the wake of the 2008/2009 financial crisis. During the 2008/2009 financial crisis, many participants in uncleared financial instruments faced counterparties that were unable to meet their obligations.

One such effort to migrate swaps to an exchange and central clearing is the formation of Eris Exchange, an exempt board of trade. As reported by the Financial Times, Eris Exchange "will offer trading in interest-rate swap derivatives closely modeled on current over-the-counter (OTC) rate swaps". Grant, Weitzman, and Mackenzie, "Chicago Traders Launch New Derivatives Exchange" Financial Times (13 Jul. 2010). The CME's clearinghouse will be the central clearer of interest-rate swap derivatives traded on Eris Exchange. "After the details of the swap, like notional value, coupon, and maturity are agreed to, the Exchange passes the new trade to the Clearing House where it is processed like a traditional futures contract." http://www.erisweb.com (accessed 17 Aug. 2010).

Unless addressed, the convexity bias and the NPV effect will in most cases result in significant pricing discrepancies between centrally-cleared interest-rate swaps and interest-rate swap futures on the one hand and uncleared interest-rate swaps on the other hand. As a result, the cleared swaps will trade at significantly different yields than the uncleared equivalent. At the very least, the convexity bias and the NPV effect could create a serious impediment to the migration of interest-rate swaps to Eris Exchange, or to any other exchange or to central clearing, including, for example, interest-rate swaps cleared through the International Derivatives Clearing Group, LLC (IDCG), 150 East 52nd Street, 5th Floor, New York, New York 10022 or the CME.

Take the example of an exchange-cleared, $100 M, 10-year, interest-rate swap traded at par (i.e. the coupon is set equal to the expected future LIBOR rates over the term of the interest-rate swap). Because this swap is cleared, without an adjustment for the convexity bias, it would have to be traded at a significantly different yield than an uncleared swap with similar terms or arbitrage opportunities would exist. Assuming that the convexity bias of a 10-year swap is 25 basis points, when the exchange-traded swap trades at a yield of 2.31, the equivalent yield of a traditional, uncleared, interest-rate swap with similar characteristics and terms would be 2.56. In this example, the 25 basis point difference in yields is worth approximately $2,000,000. Furthermore, the NPV effect will create an additional discrepancy between the cleared and uncleared interest-rate swap when the interest-rate yield curve changes such that the fair value of the swap changes. If not addressed properly, these discrepancies resulting from the convexity bias and the NPV effect will create significant confusion and serious impediment to the migration of interest-rate swaps to central clearing and exchange-traded environments.

It would therefore be desirable to offer tools that adequately address the convexity bias and the NPV effect. It would be further desirable to help enable the migration of uncleared swaps and other uncleared financial instruments that are subject to the convexity bias and the NPV effect to exchanges and central clearing to eliminate counterparty risk, whereby the parties to a trade can look solely to a clearinghouse for performance, and to provide for greater transparency.

SUMMARY OF THE INVENTION

The present invention provides financial tools that address the convexity bias and the net present value (NPV) effect. The present invention facilitates the migration of uncleared swaps and other uncleared financial instruments that are subject to the convexity bias and/or the net present value (NPV) effect to exchanges and central clearing to eliminate counterparty risk, whereby the parties to a trade look solely to a clearinghouse for performance, and for greater transparency.

In accordance with the principles of the present invention, computer implemented, back-office method of creating, centrally clearing, and settling a non-biased, financial instrument, through an electronic trading platform and an electronic central clearinghouse to effectuate payments between parties to a trade is provided. A non-biased, financial instrument in accordance with the principles of the present invention is to be centrally cleared and settled and can be traded either on or off an exchange or trading platform. The non-biased financial instruments to which the present invention applies include, but are not limited to, interest-rate swaps, interest-rate swap futures, credit default swaps, credit default swap futures, other interest rate futures, forward rate instruments, commodity swaps, total-return swaps, total-return swap futures, variance swaps, variance-swap futures, cross-currency swaps, cross-currency swap futures, foreign-exchange swaps, and foreign-exchange swap futures, regardless of the currency in which the non-biased financial instrument is denominated.

In accordance with the principles of the present invention, the computer implemented, back-office method of creating, centrally clearing, and settling a non-biased financial instrument through an electronic trading platform and an electronic central clearinghouse defines a terminal value in a way that offsets the co-movement of variation margin and investment return on the variation margin, during the life of the financial instrument. For example, in the case of an interest-rate swap, the terminal value comprises an accumulated value of payments made pursuant to the terms of the interest rate swap, minus the accumulated value of interest earned on variation margin over the life of the interest-rate swap. By addressing the convexity bias and the net present value (NPV) effect, the non-biased, centrally-cleared interest-rate swap is functionally equivalent in economic terms to an uncleared interest-rate swap.

DETAILED DESCRIPTION OF A PREFERRED EMBODIMENT

Figure 1:
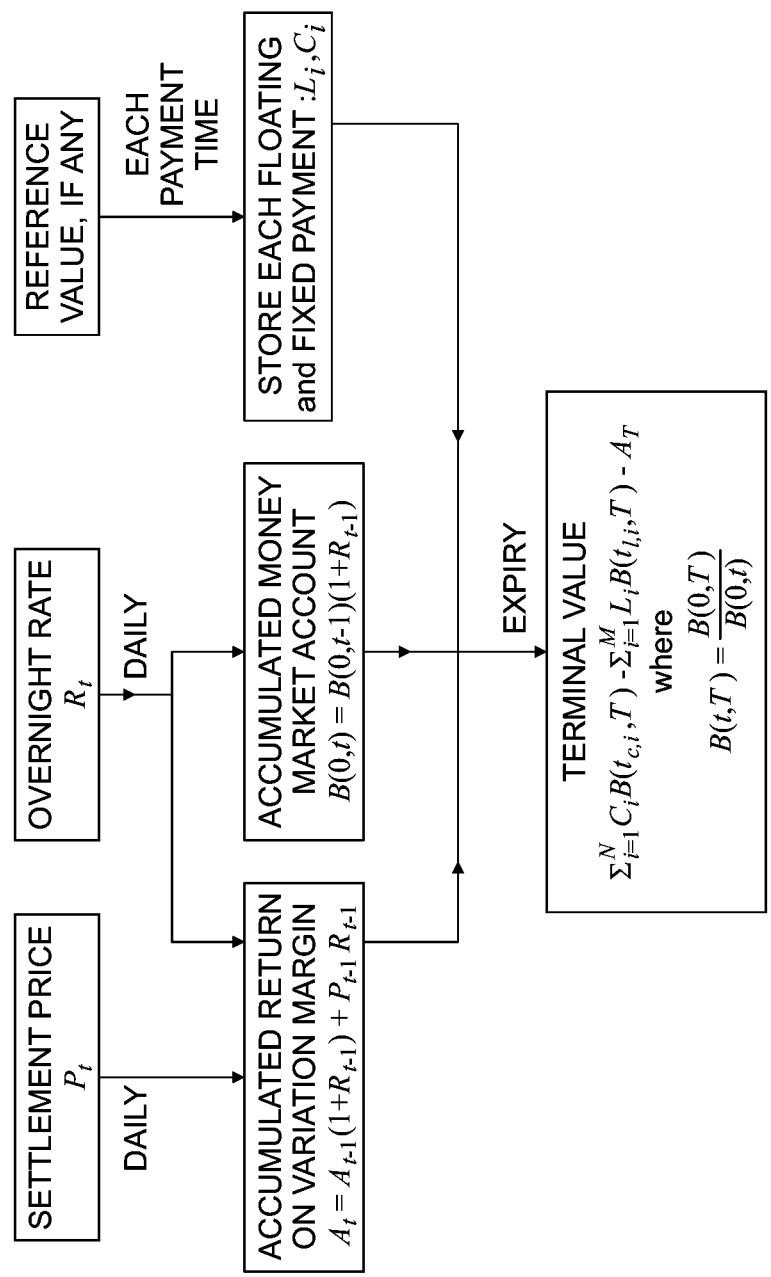
FIG. 1 is a flow-chart setting forth an example for determining the net accumulated value of cash flows for a terminal value of a non-biased, centrally-cleared financial instrument of the present invention.

While an exemplary embodiment of the invention illustrated and described has been built to trade on Eris Exchange, it will be appreciated that the present invention is not so limited and can be cleared on any clearinghouse, traded on other exchanges or trading platforms, regardless of whether located in the United States or abroad, traded through a private negotiation, traded in currencies other than United States dollars or traded as a future or as a cleared swap or other type of financial instrument. When used herein, the terms exchange and trading platform refer broadly to a marketplace in which securities, commodities, derivatives and other financial instruments are traded, and includes but is not necessarily limited to designated contract markets, exempt boards of trade, designated clearing organizations, securities exchanges, swap execution facilities, electronic communications networks, and the like.

As previously detailed, given the differences in the manner in which collateral is treated in uncleared financial instruments on the one hand and centrally-cleared financial instruments on the other hand, a centrally-cleared swap that is subject to the convexity bias and/or the NPV effect, whether traded as a future or otherwise, will, unless addressed, trade at a different value than the same swap that is uncleared. This could significantly impair the migration of swaps and other financial instruments that have traditionally not been cleared, particularly interest-rate swaps, to central clearing. The present invention provides a financial instrument that is economically equivalent to uncleared financial instruments, including swaps, thus facilitating the migration of uncleared financial instruments to centralized exchanges and/or to central clearing.

In accordance with the principles of the present invention, a centrally-cleared financial instrument is provided that addresses the convexity bias and the NPV effect. The non-biased, centrally-cleared financial instrument of the present invention is to be centrally cleared and can be traded either on or off an exchange or trading platform, whether traded as a future or other type of financial instrument. When used herein, non-biased refers to addressing the convexity bias or the NPV effect or both. The financial instruments to which the present invention applies include, but are not limited to, interest-rate swaps, interest-rate swap futures, credit default swaps, credit default swap futures, other interest-rate futures, FRAs, commodity swaps, and foreign-exchange swaps, regardless of the currency in which the financial instrument is denominated.

As the convexity bias arises from the correlation between the value of the cleared financial instrument and fixed-income instruments in general, a non-biased, centrally-cleared financial instrument of the present invention defines its terminal value (i.e. the final settlement value of the financial instrument upon its stated expiration) in a way that offsets the co-movement of variation margin and the investment return on the variation margin during the life of the financial instrument. In one embodiment in accordance with the principles of the present invention, the non-biased, centrally-cleared financial instrument is a swap that defines its terminal value to be the net accumulated value of the payments of the swap, minus the accumulated value of interest on variation margin over the life of the swap. The accumulated value of payments includes coupon payments and compounded interest earned on coupon payments. When used herein, the term swap is used in a broad, functional sense, and is not meant to be limited to any particular regulatory or legal definition thereof.

In the example of an interest-rate swap, if interest rates increase, all else being constant, the yield on the interest-rate swap will go up, or, in the alternative, if the interest-rate swap is traded in price terms, the price of the interest-rate swap will go down. Assuming this interest-rate swap is centrally cleared and traded in price terms, a short position will have a positive cash flow from the variation margin when interest rates increase. Unless the convexity bias is addressed, the party holding the short position will be able to invest the variation margin for a higher return as a result of the correlation between the interest-rate swap and interest rates in general. In this case, a non-biased, centrally-cleared financial instrument of the present invention will adjust the final payment of the financial instrument to account for the convexity bias and make the cleared financial instrument of the present invention equivalent in economic terms to an uncleared interest-rate swap.

Subtracting the accumulated value of interest on variation margin from the terminal value of a financial instrument of the present invention addresses the NPV effect. Assume the expected net cash flow of a swap increases due to a change in the value of the underlying asset, rate, commodity or index. Without the adjustment, the proper marked-to-market value of a cleared swap will increase by an amount equal to the sum of the expected change in the future cash flows. In the case of a cleared swap, this amount is paid to the buyer at the end of the day through variation margin. A non-biased, centrally-cleared financial instrument of the present invention decreases the terminal value of the financial instrument by an amount equal to the total interest earned on the accumulated variation margin over the life of the financial instrument, negating the NPV effect. Furthermore, setting the convexity bias aside, a non-biased, centrally-cleared financial instrument of the present invention will have a change in its fair value equal to the change in the sum of the present value of the expected future cash flows, which coincides with the profit (loss) of an uncleared swap position.

When a swap is traded, regardless of whether it is an exchange-traded swap future, a cleared swap or a traditional, uncleared swap, all of the terms of the fixed and floating payments are agreed upon at the time the trade is consummated. When the financial instrument is an exchange-traded swap future or a centrally-cleared swap, the position is marked to market periodically, most commonly daily, and variation margin flows based on the marked-to-market settlement. In one embodiment, the terminal value of a non-biased, centrally-cleared financial instrument of the present invention can be determined as follows:

terminal value=net accumulated value of cash flows−total return on variation margin;

where,
net accumulated value of cash flows is the accumulated value that a buyer (seller) of a financial instrument receives minus the payments the buyer (seller) makes, reinvested at the overnight rate from the date that the cash flow occurs to expiration of the financial instrument;
total return on variation margin is the sum of the interest earned on the cumulative variation margin for each day reinvested at the overnight rate to expiration of the financial instrument; and
the overnight rate is the rate specified by the exchange or clearinghouse to reflect the short-term financing rate of market participants.

The net accumulation of cash flows reinvested at the overnight rate over the life of the non-biased, centrally-cleared financial instrument of the present invention is necessary to make the financial instrument of the present invention equivalent to an uncleared financial instrument with similar terms. A party who enters into an uncleared interest-rate swap is able to invest cash received from the coupon payments daily at the overnight rate. When the party is obligated to make coupon payments under such a swap, the party will pay interest on any funds borrowed to make such payments or forego earning interest. The inclusion of the net accumulated value of cash flows in the definition of terminal value of the non-biased, centrally-cleared financial instrument of the present invention replicates the cash flows associated with the uncleared financial instrument.

The other component of the definition of the terminal value of the non-biased, centrally-cleared financial instrument of the present invention is the total return on variation margin. This adjustment addresses both the convexity bias and the NPV effect in a cleared financial instrument. While the adjustment achieves the same effect as LCH.Clearnet's Price Alignment Interest (PAI) by building the value into the final settlement price without managing the PAI cash flow on a daily basis, the current systems used to process traditional futures and cleared financial instruments will not need to change in order to handle a financial instrument created under the principles of the present invention. The PAI requires daily cash adjustments that the current systems for processing futures cannot handle. The present invention is superior in that regard and will facilitate the migration of uncleared swaps and other uncleared financial instruments to central clearing and to centralized marketplaces.

In another embodiment in accordance with the present invention, a constant can be added or subtracted to the above terminal value definition. Adding or subtracting a constant to the above terminal value definition may sometimes be preferable in order to be consistent with certain market conventions. Generally the profit and loss of a cleared financial instrument comes only from the price change, and, thus, modifying the price process by a constant does not change the nature of the financial instrument.

Referring to FIG. 1, a flow-chart of an example embodiment for determining the net accumulated value of cash flows for the terminal value of a non-biased, centrally-cleared financial instrument of the present invention is seen. In the case of an interest-rate swap, the non-biased, centrally-cleared financial instrument of the present invention would have the fixed rate as its coupon, and the term of the swap defines its expiration. Taking into account these factors, the net accumulated value of cash flows can specifically be determined as follows:

$$\text{net accumulated value of cash flows} = \sum_{i=1}^{N} C_i B(t_{c,i}, T) - \sum_{i=1}^{M} L_i B(t_{l,i}, T)$$

where,
$C_i$ is the amount of fixed leg payment payable at time $t_{c,i}$;
$L_i$ is the amount of the floating leg payment payable at time $t_{l,i}$;
T is the expiration of the financial instrument; and
$B(t, T)$ is the value of the money market account at time T with an initial deposit of 1 at time t and accumulated at overnight rate.

And total return on variation margin can be determined as:

$$\text{total return on variation margin} = \sum_{t=1}^{T-1} P_t R_t B(t+1, T),$$

where
$P_t$ is the settlement price of the financial instrument on day t, and
$R_t$ is the overnight interest rate on day t.

Here we assume, without loss of generality, the initial trading price is zero.

Figure 2:
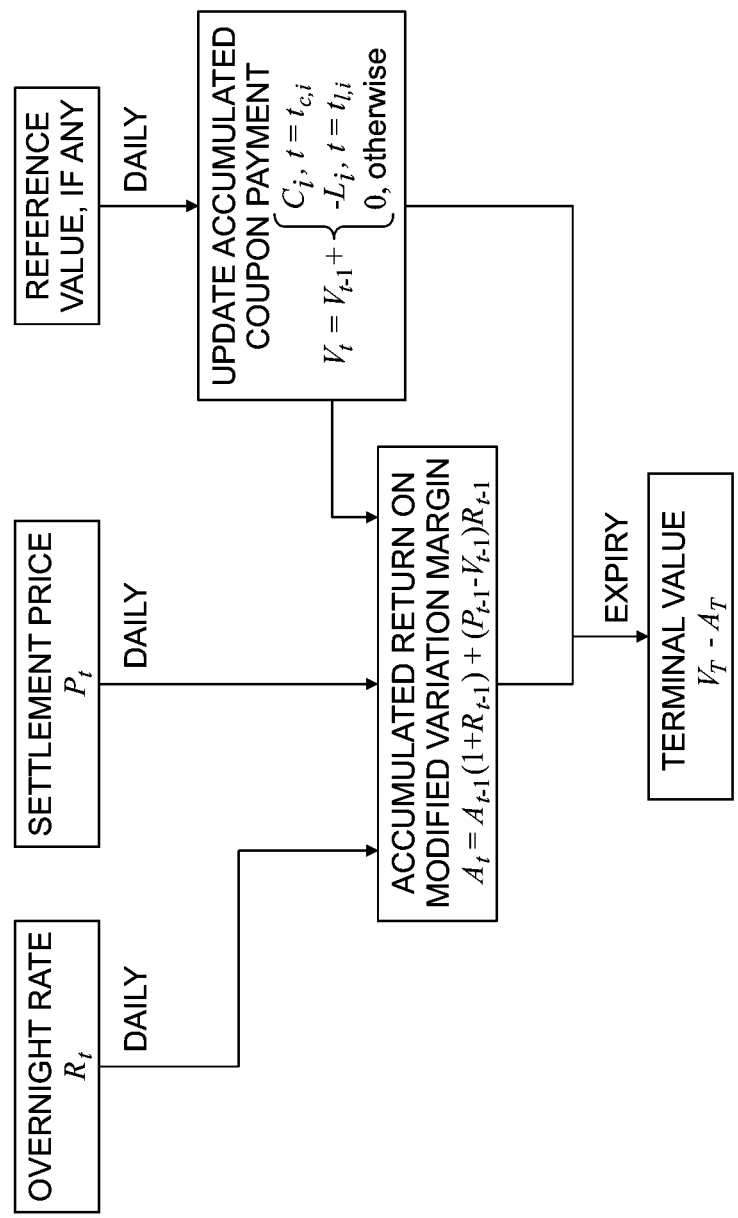
FIG. 2 is a flow-chart setting forth an alternative example for determining the terminal value of a non-biased, centrally-cleared financial instrument of the present invention.

Referring to FIG. 2, a flow-chart of an alternative example embodiment for determining the terminal value of a non-biased, centrally-cleared financial instrument of the present invention is seen. In this alternative determination of the terminal value, which is equivalent to the embodiments above, the terminal value can be determined as follows:

terminal value=net summation of cash flows−total return on modified variation margin, where, using the previous notations, $$\text{net summation of cash flows} = \sum_{i=1}^{N} C_i - \sum_{i=1}^{M} L_i; \text{ and}$$

total return on modified variation margin =

$$\sum_{t=1}^{T-1} \left( P_t - \left( \sum_{i:(t_{c,i}<t)} C_i - \sum_{i:(t_{l,i}<t)} L_i \right) \right) R_t B(t+1, T)$$

By rearranging the terms of the second terminal value definition, the equivalence of the two alternative definitions discussed above can be seen:

$$\sum_{i=1}^{N} C_i - \sum_{i=1}^{M} L_i - \sum_{t=1}^{T-1} \left( P_t - \left( \sum_{i:(t_{c,i}<t)} C_i - \sum_{i:(t_{l,i}<t)} L_i \right) \right) R_t B(t+1, T) =$$

$$\left( \sum_{i=1}^{N} C_i + \sum_{i=1}^{T} \sum_{i:(t_{c,i}<t)} C_i R_t B(t+1, T) \right)$$

$$- \left( \sum_{i=1}^{M} L_i + \sum_{t=1}^{T} \sum_{i:(t_{c,i}<t)} L_i R_t B(t+1, T) \right) - \sum_{t=1}^{T} P_t R_t B(t+1, T) =$$

-continued $$\sum_{i=1}^{N} C_i \left(1 + \sum_{t=t_{c,i}}^{T} R_t B(t+1,T)\right) - \sum_{i=1}^{M} L_i \left(1 + \sum_{t=t_{l,i}}^{T} R_t B(t+1,T)\right) -$$

$$\sum_{t=1}^{T} P_t R_t B(t+1,T) = \sum_{i=1}^{N} C_i B(t_{c,i},T) - \sum_{i=1}^{M} L_i B(t_{l,i},T) - \sum_{t=1}^{T} P_t R_t B(t+1,T)$$

The following are non-limiting examples of non-biased, centrally-cleared financial instruments created by adjusting the terminal value for the interest on variation margin in accordance with the principles of the present invention. In each example, the overnight rate is assumed to be equal to the yield on the applicable day. The discussion and the Tables set forth below are from the perspective of the buyer of the financial instrument unless otherwise noted.

Example 1

This example shows that a non-biased, centrally-cleared financial instrument in accordance with the present invention can replicate the profit and loss of a spot-starting, uncleared interest-rate swap each day. Consider a 10-year OTC swap with $100 M notional value with a par coupon of 2.0%. The buyer will receive 2.0% semi-annual interest payments on the notional amount and pay 3-month LIBOR interest payments on the notional amount quarterly.

A non-biased, centrally-cleared financial instrument in accordance with the present invention can be created to replicate such a swap. This non-biased, centrally-cleared swap has a 2.0% coupon, 10 years to maturity. Suppose the yield changes to 2.1% on day 2. The following Table 1 compares the performance of an uncleared, interest-rate swap and a non-biased, centrally-cleared swap position for the first few days:

TABLE 1

Performance of an Uncleared Swap and a Non-Biased Swap

| | | Uncleared Swap | Non-Biased, Centrally-Cleared Swap | | |
|---|---|---|---|---|---|
| Date | Yield | Total P&L to Date* | Value** | Return on Variation Margin**** | Total P&L to Date*** |
| 1 | 2.0 | 0 | 0 | 0 | 0 |
| 2 | 2.1 | −906,497 | −906,497 | 0 | −906,497 |
| 3 | 2.1 | −906,550 | −906,497 | −53 | −906,550 |
| 4 | 2.1 | −906,603 | −906,497 | −53 | −906,603 |

*The total profit and loss to date is computed as the net present value of the remaining cash flows; therefore, the value may change each day as the expiration date approaches even as the yield does not change.
**Value refers to a proper settlement value of the non-biased, centrally cleared swap.
***The total profit and loss to date for a cleared swap is the change in the settlement value of that day plus the accumulated variation margin and compounded interest earned on the accumulated variation margin.
****The return on the variation margin is computed as the one day financing cost on the accumulated variation margin from the previous settlement.

Table 1 shows that the total profit and loss to date of an uncleared swap and that of a non-biased, centrally-cleared swap created pursuant to the principles of the present invention are identical each day.

Example 2

This example shows that a non-biased, centrally-cleared financial instrument in accordance with the present invention can replicate the profit and loss of a seasoned, uncleared interest-rate swap. The coupon of a seasoned interest-rate swap is usually different from the par swap rate when the seasoned swap is traded; to compensate for this, an upfront payment is often made with the amount equal to the present value of the seasoned swap. As seen in Example 1, the buyer of the 2.0% coupon, spot-starting swap has a marked-to-market loss of $906,603 on day 4 after the yield changed to 2.1%. If the buyer decides to sell the swap on day 4, a loss of $906,603 is incurred, whether the trade is an uncleared swap or a non-biased, centrally-cleared swap future of the present invention. The following Table 2 shows the cash flow and profit and loss of the buyer of this seasoned swap:

TABLE 2

Cash Flow and Profit And Loss of Buyer of Seasoned Swap

| | | Uncleared Swap | | | | Non-Biased, Centrally-Cleared Swap Future | | |
|---|---|---|---|---|---|---|---|---|
| Date | Yield | Marked-to Market Value | Cash Flow* | Return on Cash Flow** | Total P&L to Date | Value | Return on Variation Margin | Total P&L to Date |
| 4 | 2.1 | −906,603 | 906,603 | 0 | 0 | −906,497 | 0 | 0 |
| 5 | 2.1 | −906,655 | 0 | 53 | 0 | −906,497 | 0 | 0 |
| 6 | 2.1 | −906,708 | 0 | 53 | 0 | −906,497 | 0 | 0 |

*Since the present value of the seasoned swap is negative on day 4, the buyer receives a payment equal to the present value, $906,603.
**The initial payment generates interest income for the buyer each day.

Table 2 shows that the total profit and loss to date of a seasoned, uncleared swap can be replicated by a non-biased, centrally-cleared swap future created pursuant to the principles of the present invention, if the non-biased, centrally-cleared swap is initiated on the same day as the uncleared swap.

Example 3

This example shows that a non-biased, centrally-cleared financial instrument in accordance with the present invention can replicate the profit and loss of an uncleared forward-starting interest-rate swap. Consider the same swap as specified in Example 1—a 10-year swap with $100 M notional value with the par coupon 2.0%. In this example, the swap starting date is one year from the date it is traded. A non-biased, centrally-cleared swap future of the present invention is traded on the same day. Suppose after 6 months, the yield changes to 2.1. The following Table 3 shows the cash flow and profit and loss before and after the yield changes:

TABLE 3

Cash Flow and P&L Before and After Yield Change

| | | Non-Biased, Centrally-Cleared Swap | | |
| --- | --- | --- | --- | --- |
| Date | Yield | Uncleared Swap Total P&L to Date | Value | Return on Variation Margin | Total P&L to Date |
| 180 | 2.0 | 0 | 0 | 0 | 0 |
| 181 | 2.1 | −897,081 | −897,082 | 0 | −897,081 |
| 182 | 2.1 | −897,133 | −897,081 | −52 | −897,133 |

Table 3 shows that the total profit and loss to date of a forward-starting, uncleared swap can be replicated by a non-biased, centrally-cleared swap future created pursuant to the principles of the present invention each day.

Example 4

This example compares the economics of a centrally-cleared, interest-rate swap without adjustments for the convexity bias and the NPV Effect (referred to as an unadjusted cleared swap), with a non-biased, centrally-cleared swap in accordance with the present invention. The unadjusted cleared swap is assumed to be settled at the proper value each day. Continuing the example set forth in Example 1, when an uncleared swap trades at a yield of 2.0%, a convexity-biased, interest-rate swap future would trade at a higher yield. Assuming the convexity bias for a 10-year swap is 25 basis points, the equivalent par coupon of the interest-rate swap future without adjustment for the convexity bias is 2.25%. Table 4 compares the profit and loss of a non-biased, centrally-cleared swap future of the present invention and an unadjusted cleared swap:

TABLE 4

Profit and Loss after a Yield Change

| | | Non-Biased, Centrally-Cleared Swap Future Coupon = 2 | | | Unadjusted Cleared Swap Coupon = 2.25 | | |
| --- | --- | --- | --- | --- | --- | --- | --- |
| Date | Yield | Value | Return on variation margin | Total P&L to Date | Value | Return on variation margin | Total P&L to Date |
| 1 | 2.0 | 0 | 0 | 0 | 0 | 0 | 0 |
| 2 | 2.1 | −906,497 | 0 | −906,497 | −1,000,000* | 0 | −1,000,000 |
| 3 | 2.1 | −906,497 | −53 | −906,550 | −1,000,000 | −54 | −1,000,054 |

*The fair settlement value is equal to the sum of the future cash flows.

Table 4 shows that the total profit and loss to date of a non-biased, centrally-cleared swap future created pursuant to the principles of the present invention is different from that of an unadjusted cleared swap due to the NPV effect. Furthermore, an unadjusted cleared swap is traded at a different par coupon from the uncleared swap due to the convexity bias.

Example 5

This example shows non-biased swap future in accordance with the present invention can replicate the profit and loss of an off-market swap. An off-market swap is a swap that has a value other than zero at initiation. When an off-market swap is traded, the coupon is usually set to be higher or lower than the par swap rate, and an upfront payment is made between the parties.

Assume a $100M notional value, 10-year, uncleared spot-starting swap is traded when the par yield is 2.0% and the coupon is set to be 3.0%. The present value of this swap is $8,927,737. The corresponding non-biased, centrally-cleared swap future of the present invention is traded with the same terms. Table 5 shows that the non-biased, centrally-cleared swap future of the present invention replicates the profit and loss of this off-market, uncleared swap when the yield changes to 2.1%:

TABLE 5

Cash Flow and Profit and Loss of an Off-Market Swap

| | | Uncleared Swap | | | | Non-Biased, Centrally-Cleared Swap Future | | |
|---|---|---|---|---|---|---|---|---|
| Date | Yield | Marked-to-Market Value | Cash flow | Return on Cash Flow | Total P&L to Date | Value | Return on Variation Margin | Total P&L to Date |
| 1 | 2.0 | 8,927,737 | −8,927,740 | 0 | 0 | 0 | 0 | 0 |
| 2 | 2.1 | 8,001,468 | | −496 | −926,765 | −926,765 | 0 | −926,765 |
| 3 | 2.1 | 8,001,935 | | −521 | −926,819 | −926,765 | −54 | −926,819 |

Table 5 shows that the total profit and loss to date of an off-market, uncleared swap can be replicated by a non-biased, centrally-cleared swap future created pursuant to the principles of the present invention each day.

Example 6

An embodiment of a non-biased, centrally-cleared financial instrument in accordance with the principles of the present invention can trade as an interest-rate swap future and defines its terminal value according to the foregoing definition with a constant of 100 added to the futures price to be consistent with market convention. In this example, this embodiment will be referred to as the "total-return swap future". The initial price of a swap future with a par coupon is 100.

In this example, the total-return swap future is compared with an interest-rate swap cleared through IDCG. Two points are highlighted through this comparison. First, as a main feature of the IDCG interest-rate swap, fixed and floating coupon payments, as defined by the terms of the swap, are exchanged bilaterally when they become due. The total-return swap future replicates the economic effect of the coupon payments without requiring bilateral payments by having the definition of terminal value include the net accumulation of cash flows. Second, since the IDCG swap generates daily variation margin, without appropriate adjustment, the total profit and loss on the IDCG swap is not equivalent to an uncleared swap as a result of both the convexity bias and the NPV effect.

Assume two different 10-year spot starting par swaps with a notional value of $100 M as in Example 1 are traded as a total-return swap future and on IDCG simultaneously. Both are centrally cleared. The par coupon of the total-return swap future is 2.0%, equal to the prevailing yield. For the purpose of comparison, assume the IDCG cleared swap is traded at the same coupon.

To show that the total-return swap future replicates the economic effect of the coupon payments without requiring bilateral payments, Table 6a compares the cash flow and the profit and loss of the total-return swap future with the IDCG cleared swap before and after a payment is due pursuant to the terms of the swap. Assuming the yield does not change from day 1 to day 90, a floating payment of $500,000 is payable from the buyer to the seller.

TABLE 6a

Comparison of IDCG Cleared Swap and Total-Return Swap Future

| | | IDCG Cleared Swap Coupon = 2 | | | | | Total-Return Swap Future Coupon = 2 | | |
|---|---|---|---|---|---|---|---|---|---|
| Date | Yield | Marked to Market Value | Coupon Payment | Accum. Variation Margin | Accum. Interest on Coupon Payment | Total P&L to Date | Settlement Price | Return on Variation Margin | Total P&L to Date |
| 90 | 2.0 | 500,000 | −500,000 | 0 | 0 | 0 | 100 | 0 | 0 |
| 91 | 2.0 | 500,028 | | 28 | −28 | 0 | 100 | 0 | 0 |

Table 6a shows that the total profit and loss to date of a total-return swap future is the same as that of an IDCG cleared swap without requiring bilateral coupon payments.

To demonstrate that the IDCG cleared swap without appropriate adjustment is not equivalent to an uncleared swap, assume the yield changes to 2.1% on day 92. Table 6b compares the cash flows and profit and loss of the IDCG cleared swap and the total return swap future:

TABLE 6b

Comparison of IDCG Cleared Swap and Total Return Swap Future after Yield Change

| | | IDCG Cleared Swap Coupon = 2 | | | | | Total-Return Swap Future Coupon = 2 | | |
|---|---|---|---|---|---|---|---|---|---|
| Date | Yield | Marked to Market Value | Coupon Payment | Accum. Variation Margin | Accum. Interest on Coupon Payment | Total P&L to Date | Settlement Price | Return on Variation Margin | Total P&L to Date |
| 92 | 2.1 | −417,744 | | −917,744 | −57 | −917,800 | 99.0822 | 0 | −917,800 |
| 93 | 2.1 | −417,768 | | −917,822 | −86 | −917,908 | 99.0822 | −54 | −917,854 |

Table 6b shows that the total profit and loss to date on the IDCG cleared swap is different from that of the total return swap future. As already seen from previous examples, the non-biased, centrally-cleared swap future created in accordance to the principles of the present invention is economically equivalent to an uncleared swap. Therefore the IDCG cleared swap, without proper adjustments, does not generate the same profit and loss as an uncleared swap. The reason for this discrepancy in the total profit and loss to date is because all of the changes in net present value of the IDCG swap flow to and from the buyer through variation margin, causing the NPV effect to be present. And further, because the accumulated variation margin accrues interest at a rate that is correlated with the marked-to-market value of the IDCG swap, the convexity bias is also partly responsible for the discrepancy in the profit and loss.

Example 7

The following example illustrates the NPV effect in the case of a cleared credit default swap (CDS) without adjustment. Consider two counterparties enter into a $10 M notional value, 5-year CDS with XYZ Corp as the reference entity, at a premium of 500 basis points of the notional amount per annum (known as the spread). This obligates the buyer to pay $125,000 ($10 M*5.0%/4) to the seller every quarter for 5 years, or until the default of XYZ Corp if the default occurs before the maturity of the CDS. In return, the buyer will receive $10 M if XYZ Corp defaults within the 5-year period of the CDS. To simplify this example, the default risk of XYZ Corp is assumed to be uncorrelated with interest rates; that being the case, a cleared CDS would have traded at the same spread (i.e. 500 basis points) in the absence of convexity bias. Assume that immediately after the trade is consummated, the market assessment of the default risk of XYZ Corp changes, and the spread of a 5-year XYZ Corp CDS is now 300 basis points. The following will compare the profit and loss between an uncleared CDS, a cleared CDS without adjustment for the NPV effect, and a non-biased, centrally-cleared financial instrument created in accordance with the principles of the current invention.

In the case of an uncleared CDS, the marked-to-market value of the original CDS with 500 basis point spread is equal to the sum of the present value of a stream of −$50,000 ($10 M*(−5.0%+3.0%)/4) quarterly payments until the maturity of the CDS or the default of XYZ Corp, whichever comes first, or approximately −$758,432 assuming an interest rate of 6.0% and a certain probability of default. If the buyer unwinds the position at that time, a loss of −$758,432 is realized.

Consider a cleared CDS without adjustment where the exchange or the clearinghouse requires the daily settlement to be equal to the net present value of an uncleared CDS. Since the net present value of the CDS at the end of day one is −$758,432, a loss of the same amount occurs to the buyer through the variation margin. However, even after the variation margin flows, the buyer needs to pay a certain amount to unwind the position. To see this, consider a third party "buys" this CDS from the original buyer with no payment. The credit risk can be hedged by selling a new CDS at the spread of 300 basis points with the same notional value and maturity. The net marked-to-market value of long a CDS at 500 basis points and short a CDS at 300 basis points will decrease from −$758,432 to −$1,000,000 (−$50,000*4*10), if the default does not occur before the maturity, and otherwise to a value between −$758,432 and −$1,000,000. The present value of this stream of negative cash flow is approximately −$153,334, which is the fair price that the original buyer has to pay to the third party to unwind its position. The total loss from trading this cleared CDS is thus significantly more than that from trading the uncleared CDS. This is caused by the NPV effect.

Now consider the non-biased, centrally-cleared financial instrument created in accordance with the principles of the present invention. On day one, after the CDS spread changes to 300 basis points, the fair settlement value will be equal to the net present value of the uncleared CDS, i.e., −$758,432. The buyer can unwind its position by entering a short position in a new CDS with the spread of 300 basis points and the same notional value and maturity. The terminal value of these long and short positions, in accordance with the present invention, is equal to the accumulated value of a stream of −$50,000 paid quarterly until the maturity of the CDS or the default of XYZ Corp, whichever comes first, minus the accumulated value of all the interest paid for this stream of negative cash flows. Therefore, the terminal value is equal to the present value of this stream of negative cash flows, or −$758,432. The buyer will have no additional profit or loss, and the loss of $758,432 is locked in on day one. Thus, the centrally-cleared financial instrument has the same economic effect as the uncleared CDS when the CDS spread changes.

This concludes the Examples of non-biased, centrally-cleared financial instruments created by adjusting the terminal value for the interest on variation margin in accordance with the principles of the present invention.

A non-biased, centrally-cleared financial instrument in accordance with the principles of the present invention may be transacted by a variety of means, including but are not limited to a trading floor, telephone or electronically. After the trade has been agreed to by the buyer and seller, whether it is in a private communication or a publicly accessible medium, a financial instrument of the present invention will then be submitted to a clearinghouse for central clearing. A further aspect of the present invention relates to the electronic clearing and settling of such non-biased, centrally-cleared financial instruments.

In accordance with the principles of the present invention, on a periodic, generally daily basis, the exchange or clearinghouse may determine and publish a settlement price for a non-biased, centrally-cleared financial instrument. The settlement price of the non-biased, centrally-cleared financial instrument is determined by the market price at which the non-biased, centrally-cleared financial instrument is quoted or traded on each day. In the case where a market price is not directly observed, the non-biased, centrally-cleared financial instrument should be settled at a value that is consistent with other related financial instruments whose market prices are observable. In such case, the financial instrument can be settled at a value equal to a sum of present value of remaining asset flows, plus accumulated value of past asset flows, minus accumulated return on variation margin.

Take a non-biased, centrally-cleared, interest-rate swap as an example; if a non-biased, centrally-cleared swap created according to the present invention does not have a market price on a particular day, the exchange or clearinghouse will settle the interest-rate swap to a value equal to the sum of the present value of remaining cash flows, plus the accumulated value of past cash flows, minus the accumulated total return on variation margin to date. The evaluation of cash flows utilizes a yield curve constructed using other liquid, interest-rate swaps or interest-rate financial instruments; therefore, consistency with the value of a liquid, non-biased, centrally-cleared, interest-rate swap is guaranteed.

The following is a non-limiting example of a daily settlement methodology implemented for a centrally-cleared interest-rate swap in accordance with the principles of the current invention.

Example 8

Consider the 10-year interest-rate swap set forth in Example 1. On the day the trade is consummated, the non-biased, centrally-cleared swap is settled to its present value according to the following standard practice of valuing interest-rate swaps: First, a yield curve is built from the current cash deposit rates, LIBOR, Eurodollar futures, and swap rates for a list of key maturities: 3 year, 4 year, 5 year, 10 year, 15 year, 20 year, and 30 year. Using a "bootstrapping" method, the yield curve is constructed from those rates or instruments.

Second, the present value of the fixed leg is computed as:

$$PV_{fixed} = C \times P \times \sum_{i=1}^{M} \left( \frac{t_i}{T_i} \times df_i \right),$$

where P is the notional amount, C is the fixed coupon of the swap, M is the number of the fixed payments, $t_i$ is the number of days in period i, $T_i$ is the basis according to the day count convention, and $df_i$ is the discount factor derived from the yield curve constructed as above for the $i^{th}$ fixed coupon payment. Third, the present value of the floating leg is computed as:

$$PV_{float} = P \times \sum_{j=1}^{N} \left( f_j \times \frac{t_j}{T_j} \times df_j \right),$$

where N is the number of the floating payments and $f_j$ is the forward rate for the time period j. Finally, the present value of the swap is computed as $PV_{fixed} - PV_{float}$.

A non-biased, centrally-cleared, interest-rate swap with the par coupon of 2.0% as in Example 1 is settled at 0 on day 1.

On day 2, assume the yield curve shifts upwards by 10 basis points. The settlement value of this non-biased, centrally-cleared interest-rate swap is computed as the present value of remaining cash flows of the swap, plus the accumulated value of past cash flows, minus the accumulated total return on variation margin to date. The present value of remaining cash flows is equal to $PV_{fixed} - PV_{float} = \$9,093,503 - \$10,000,000 = -\$906,497$. The accumulated value of past cash flow is 0 as no coupon payment has been made, and the accumulated total return on variation margin is 0 since no variation margin has been generated since the initial trading day. Therefore the settlement value of the non-biased, centrally-cleared interest rate swap is equal to −$906,497 on day 2.

On day 3, assume there has been no change in the yield curve since day 2. The present value of remaining cash flows is equal to $PV_{fixed} - PV_{float} = \$9,093,450 - \$10,000,000 = -\$906,550$. The accumulated value of past cash flows is still 0. The accumulated total return on variation margin, currently −$906,497, is equal to the −$53 (−$906,497*2.1%365). Therefore, the settlement value on day 3 is equal to $-906,497(-\$906,550-(-\$53))$.

The non-biased, centrally-cleared financial instrument may be marked to market, generally daily, using its settlement price. On the same time scale that a settlement value is published, generally daily, the clearinghouse can compute the variation margin requirement for each non-biased, centrally-cleared financial instrument. Cash flow payments reflecting the variation margins will flow between the clearinghouse and parties holding open positions in non-biased, centrally-cleared financial instruments on a periodic, generally daily basis.

The clearinghouse must store and maintain the historical data series of daily settlement values for each financial instrument, as well as the overnight interest rate. These, in addition to the initial trade price, are required for determining the terminal value and may be stored in a database and can be published to the marketplace.

On the last day of the existence of the non-biased, centrally-cleared financial instrument, generally known as expiration, the clearing house will compute and settle the non-biased, centrally-cleared financial instrument to the terminal value as defined according to the principles of the present invention. As previously described, in one example a non-biased, centrally-cleared financial instrument of the present invention can be cleared and settled utilizing a terminal value determined in accordance with the previously detailed alternative embodiments.

According to the principles of this invention, in order to publish daily and terminal settlement values, a clearinghouse, exchange, futures commission merchant or other market participant may use computers with software specifically designed for this purpose. The computation of the terminal value in accordance with the present invention is iterative and complex, and special software is required for this purpose. This software may be linked to a centralized marketplace via data lines, networks or the Internet, so that the prices are published in a seamless manner. The clearing house may store the daily prices for each financial instrument in existence at any given moment in a database and can be electronically published to the marketplace.

Figure 3:
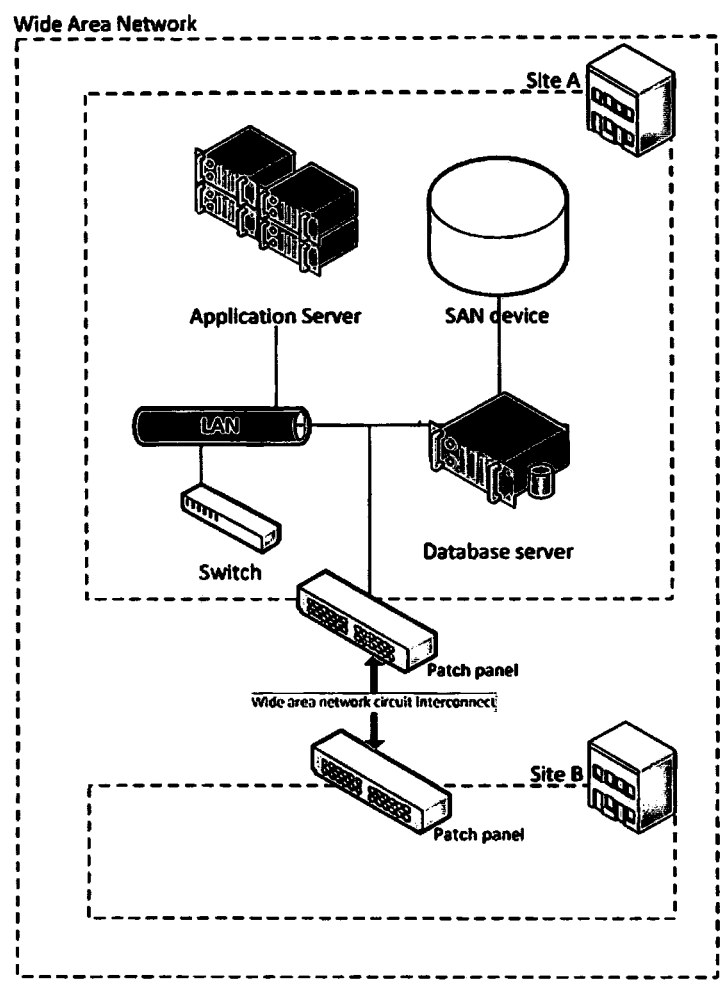
FIG. 3 is a non-limiting example of a hardware infrastructure that can be used to run a system that implements electronic clearing and settling of the non-biased, centrally-cleared financial instrument of the present invention.

Referring to FIG. 3, a non-limiting example of a high level hardware implementation can used to run a system of the present invention is seen. The infrastructure should include but not be limited to: wide area network connectivity, local area network connectivity, appropriate network switches and routers, electrical power (backup power), storage area network hardware, server-class computing hardware, and an operating system such as for example Redhat Linux Enterprise AS Operating System available from Red Hat, Inc, 1801 Varsity Drive, Raleigh, North Carolina.

The clearing and settling and administrative applications software server can run for example on an HP ProLiant DL 360 G6 server with multiple Intel Xeon 5600 series processors with a processor base frequency of 3.33 GHz, up to 192 GB of RAM, 2 PCIE expansion slots, 1 GB or 10 GB network controllers, hot plug SFF SATA drives, and redundant power supplies, available from Hewlett-Packard, Inc, located at 3000 Hanover Street, Palo Alto, California. The database server can be run for example on a HP ProLiant DL 380 G6 server with multiple Intel Xeon 5600 series processors with a processor base frequency of 3.33 GHZ, up to 192 GB of RAM, 6 PCIE expansion slots, 16 SFF SATA drive bays, an integrated P410i integrated storage controller, and redundant power supply, available from Hewlett-Packard.

While the invention has been described with specific embodiments, other alternatives, modifications, and variations will be apparent to those skilled in the art. Accordingly, it will be intended to include all such alternatives, modifications and variations set forth within the spirit and scope of the appended claims.

What is claimed is:

1. A computer-implemented financial instrument electronic trading platform in communication with an electronic central clearinghouse, said system including:

a memory of an electronic trading platform that receives an identity of a first party, an identity of a first financial instrument, a buy/sell request, an identity of a second party, an identity of a second financial instrument, and a sell/buy request;

a processor in communication with said memory of the electronic trading platform that electronically automatically determines when the first financial instrument matches the second financial instrument, when the first financial instrument matches the second financial instrument, then said processor in communication with said memory of the electronic trading platform electronically automatically determines when the buy/sell request matches the sell/buy request, and when the buy/sell request matches the sell/buy request, said processor in communication with said memory of the electronic trading platform electronically automatically determines a final settlement value of a financial instrument upon its stated expiration in accordance with:

net accumulated value of cash flow−total return on variation margin for the life of the financial instrument, where, net accumulated value of cash flow is the accumulated value that the first party of the financial instrument receives minus the payments the first party makes, reinvested at the overnight rate from the date that the cash flow occurs to expiration of the financial instrument, total return on variation margin for the life of the financial instrument is the sum of the interest earned on the cumulative variation margin for each day reinvested at the overnight rate to expiration of the financial instrument, and the overnight rate is the rate specified by the exchange or clearinghouse to reflect the short-term financing rate of market participants, automatically electronically storing the final settlement value of the financial instrument upon its stated expiration in a memory of the electronic central clearinghouse, and by a processor in communication with said memory of the electronic central clearinghouse centrally clearing and settling the financial instrument by automatically electronically associating the centrally cleared and settled financial instrument with a trading account associated with the first party and automatically electronically associating the centrally cleared and settled financial instrument with a trading account associated with the second party, whereby the final settlement value of said financial instrument upon its expiration offsets co-movement of variation margin and investment return on the variation margin to address at least one of the convexity bias and the net present value (NPV) effect.

2. The computer-implemented financial instrument electronic trading system of claim 1 wherein the financial instrument is one of interest-rate swaps and interest-rate swap futures.

3. The computer-implemented financial instrument electronic trading system of claim 1 wherein the financial instrument is one of credit-default swaps and credit-default swap futures.

4. The computer-implemented financial instrument electronic trading system of claim 1 wherein the financial instrument is one of forward rate agreements and other interest-rate futures.

5. The computer-implemented financial instrument electronic trading system of claim 1 wherein the financial instrument is commodity swaps.

6. The computer-implemented financial instrument electronic trading system of claim 1 wherein the financial instrument is one of total return swaps and total return swap futures.

7. The computer-implemented financial instrument electronic trading system of claim 1 wherein the financial instrument is one of variance swaps and variance-swap futures.

8. The computer-implemented financial instrument electronic trading system of claim 1 wherein the financial instrument is one of cross-currency swaps and cross-currency swap futures.

9. The computer-implemented financial instrument electronic trading system of claim 1 wherein the financial instrument is one of foreign-exchange swaps and foreign exchange swap futures.

* * * * *